Jan. 20, 1953 A. ENGELHARDT 2,625,864
ROTATABLY ADJUSTABLE CAMERA BACK
Filed Feb. 21, 1951 3 Sheets-Sheet 3

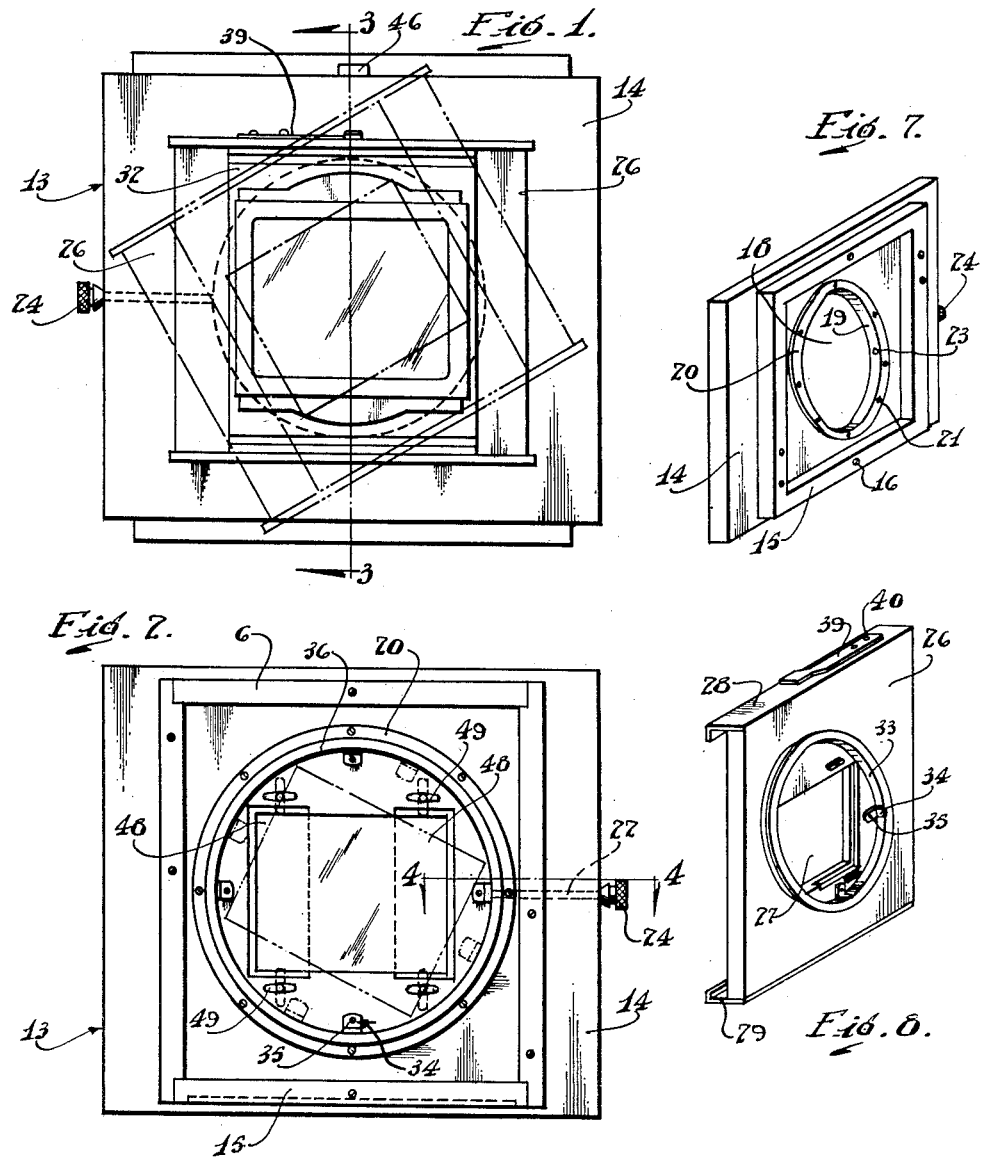

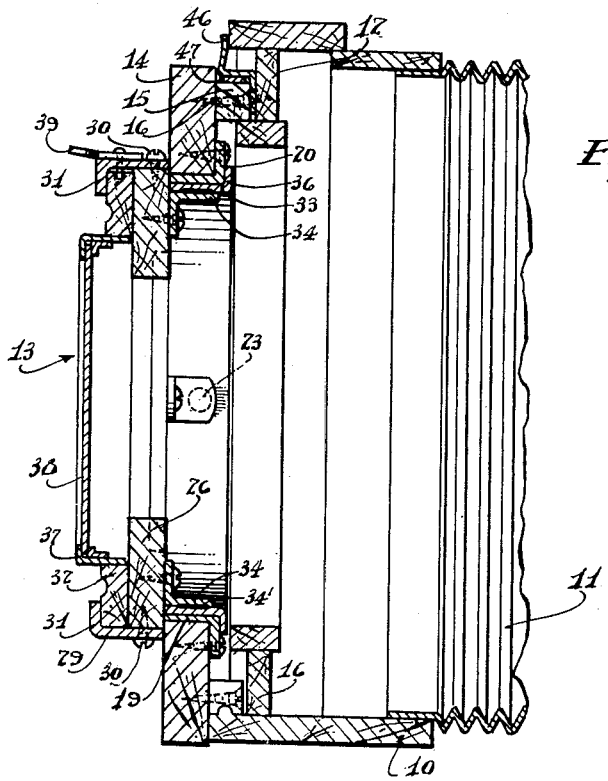

INVENTOR
Adolph Englehardt
BY
ATTORNEYS

Patented Jan. 20, 1953

2,625,864

UNITED STATES PATENT OFFICE 2,625,864

ROTATABLY ADJUSTABLE CAMERA BACK

Adolph Engelhardt, Bismarck, N. Dak.

Application February 21, 1951, Serial No. 212,176

1 Claim. (Cl. 95—48)

The present invention relates to cameras and more particularly to improvements in the construction and operation of camera backs and their associated parts.

An important object is to provide a camera back with a base having an opening in which is revolubly mounted a carriage and film holder and in which means are provided for maintaining the carriage and film holder in a rotary adjusted position so that portraits or photographs can be taken by the camera to give the impression that the subject is leaning forward or backward.

A further object consists in associating with the carriage a longitudinally or transversely adjustable film or plate holder which may be detachably connected to spaced shields or masks so as to block off portions of light which would normally fall upon the ground glass of the film holder, in order that different size photographs or pictures can be taken when the revoluble and slidable film holder is either in its upright position or its horizontal position.

Other objects and advantages of the invention will become apparent from the following description when taken in conjunction with the accompanying claim and drawings.

Referring to the drawings in which is shown the preferred embodiment of the invention:

Figure 1 is a front view of a camera back constructed in accordance with the present invention.

Figure 2 is a rear view of Figure 1.

Figure 3 is an enlarged sectional view taken substantially along the line 3—3 of Figure 1, showing the camera back connected to the camera box.

Figure 4 is an enlarged sectional view taken substantially along the line 4—4 of Figure 2.

Figure 5 is a detailed sectional view of the top of the revoluble carriage.

Figure 7 is a detail perspective view of the base member of the camera back showing the annular bearing member and the moulding, and Figure 8 is a detail perspective view of the rotatable carriage showing the retaining ring and guide members secured thereto.

Figure 6:
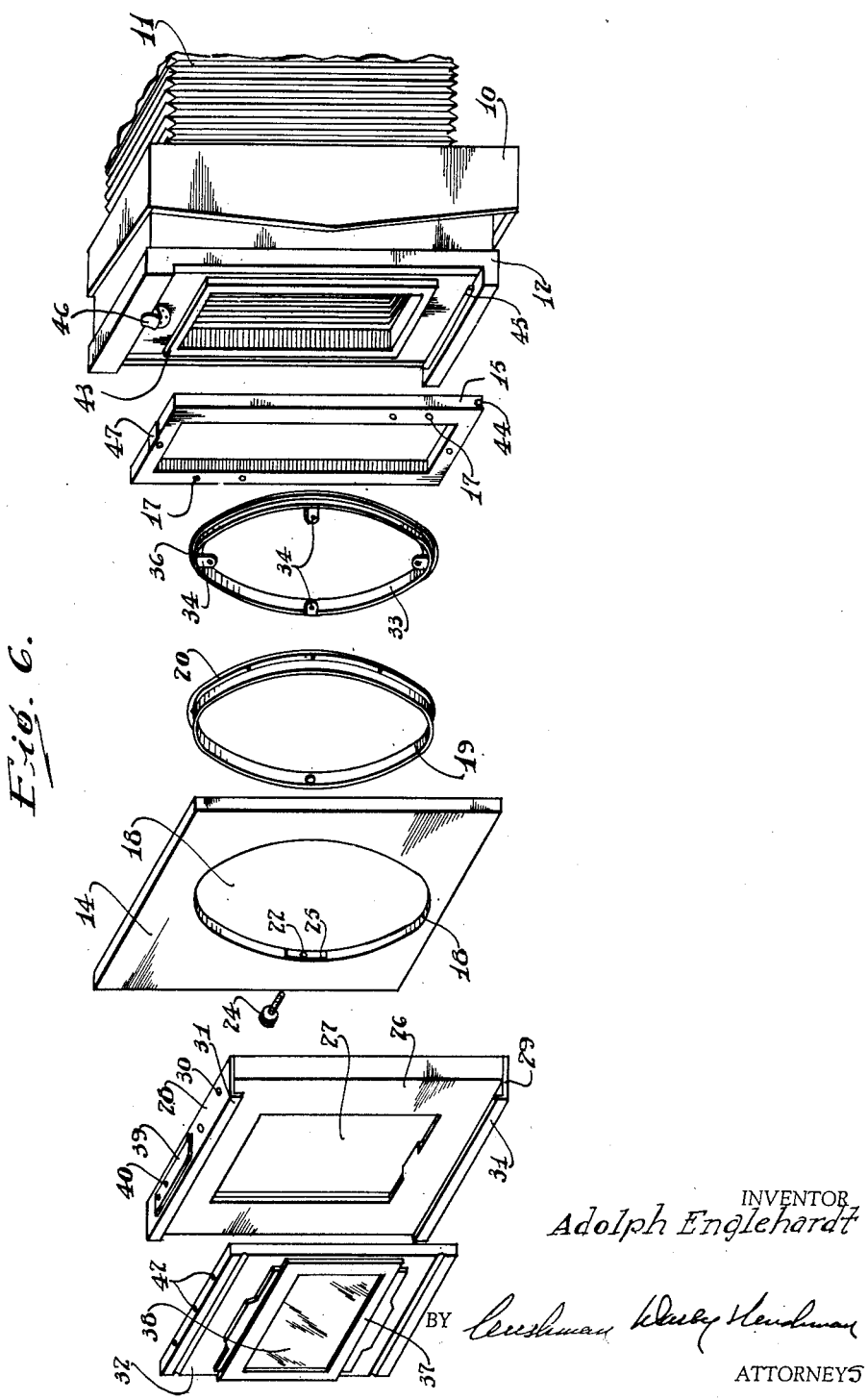
Figure 6 is an exploded view of the camera back shown associated with a camera.

Referring to the drawings, 10 indicates a camera box of any well known type and for the purpose of illustration is shown as a portrait camera having the usual bellows 11 and rear end frame 12.

The improved unitary camera back 13 includes a base 14 (Fig. 6) of any suitable size and shape and which, as shown, is made of wood. To the inner side of the base 14 is secured a rectangular frame or moulding 15 (Fig. 7) by the screws 16 which extend through openings 17 in the frame. The base 14 has a centrally disposed circular opening 18 which is surrounded by the frame 15. An annular bearing member or plate 19 fits within the opening 18 and has a lateral flange 20 (Fig. 7) which bears against the inner side of the base 14 so as to be secured thereto in any suitable manner such as by the screws 21. The base 14 on one vertical side thereof is provided with a transverse opening 22 which registers with a complementary formed opening 23 in the ring 19. A threaded retaining screw 24 extends through the opening 22, a threaded plate 25 and the opening 23 (Fig. 4) for a purpose subsequently to be described.

A rotatable carriage 26 is positioned in front of the base 14 and has a rectangular opening 27 that registers with the opening 18. Guide plates 28 and 29 are preferably connected to the top and bottom sides respectively of the carriage 26 in any suitable manner such as by the screws 30 (Fig. 6). The plates 28 and 29 are provided with inwardly disposed aligned flanges 31 that form a longitudinal or transverse guideway for a photographic film or plate holder 32. A ring or annular member 33 is provided with circumferentially spaced lugs 34 which may be welded thereto as at 34' or otherwise suitably connected. The lugs have openings for receiving screws 35 that secure the ring to the inner side of the carriage 26 (Fig. 8) concentric with the opening 27. The ring 33 also is provided with a lateral annular flange 36 that rests against the flange 20 of the ring 19. The inner end of the retaining screw 24 is arranged to bear against the outer periphery of the ring 33 so as to releasably maintain the same in a fixed locked position. The opening in the rear of the camera box 10 and the opening 18 in the base 14 are of such a size as not to obstruct the opening 27 in the revoluble carriage 26, regardless of any angular position the latter may be rotated relative to the base 14.

The film or plate holder 32 is of such size and shape as to be slidably mounted in front of the carriage 26 and be guided in its longitudinal or transverse movement by the opposed flange members 28 and 29. The film holder carries the usual negative frame 37 and the ground glass 38, with which are associated the plates or other sensitized materials to be exposed. A flexible finger or strap 39 is connected at one end as at 40 in any suitable manner to the top of the guide plate 28 (Fig. 5) and has its opposite end provided with a depending lug 41 arranged selectively to fit into longitudinally spaced openings 42 (Fig. 5) in the top of the film holder 32 so as to lock the same in any fixed transverse position relative to the carriage and the optical axis of the camera.

When the camera back is connected to the rear of the camera box, the frame or moulding 15 is of such size and dimension as to snugly fit and enclose on all sides the adjacent moulding 43 on the camera box in order to provide a light trap for keeping light out of the camera. The bottom of the frame 15 may be provided with a longitudinally extending recess or groove 44 that releasably engages a transverse rib or projection 45 on the rear end frame 12. A spring catch 46 may be connected to the end frame 12 so as to releasably engage the front of a plate 47 on the frame 15, so that when the camera back is assembled in its operative position on the rear of the camera and the wall of the recess 44 is in engagement with the rib 45, the catch 46 provides means for releasably maintaining the unitary camera back in a fixed position.

The film holder, as shown, is of a size and shape to make a single exposure on a 5 x 7 film. In order to make two 3 x 5 photographs on the same film, there may be provided spaced masks or shields 48 (Fig. 2) which fit in the opening 27 of the frame 26 and are detachably secured in position by the catches 49 on the rear side of the carriage 26. Thus, it will be seen that simple and efficient means are provided for producing a different number of exposures upon the plates by associating the spaced masks or shields 38 therewith. Each of the masks or shields 38 is removably connected to the camera back so that one mask may be readily substituted for another. By use of the masks or shields 48, two size 3 x 5 upright or two size 5 x 3 horizontal photographs can be taken on one 5 x 7 film.

In operation, assuming that the revolving camera back 13 is associated with a professional studio camera and the parts are assembled, as particularly shown in Figure 3, it will be seen that the rotatable carriage 26 and film holder 32 and their associated parts may be maintained either in a horizontal position or rotated to an inclined position (Fig. 1) by engagement of the inner end of the retaining screw 24 with the annular member 33 in order to insure the film holder being accurately positioned in the focal plane of the camera lens. If the carriage 26 is in its horizontal position and it is desired to take a portrait of the subject either leaning forwards or backwards, this may be readily effected by releasing the set screw 24 which permits rotation of the carriage 26 and the film holder 32 to any desired inclined position such as shown in dotted lines in Figure 1. Upon tightening of the set screw 24 against the ring 33, these parts are maintained firmly in a fixed position. The rotatable adjusting or shifting of the film or plate holder 32 and its associated parts does not require removal of the camera back 13 from the camera and permits focusing with the ground glass frame 37 in any desired position. Thus, the subject may be photographed with the film holder or plate either positioned lengthwise or crosswise and shown as leaning forwardly or backwardly. Moreover, different size pictures can be taken on a single film or the same size photographic negative and the ground glass frame can be used in any position in a circle and yet remain properly centered relative to the optical axis of the camera. The assembled camera back may be varied as to size and shape and so constructed as to be readily connected to any suitable type of camera at a minimum expenditure of time and effort. Additionally, means are provided for preventing the introduction of light into the camera, as well as means for taking portraits so as to show the subject leaning either forwardly or backwardly.

It will be understood that the form of the invention shown is merely illustrative and that such changes may be made as come within the scope of the following claim.

I claim:

In combination with a camera box having an opened rear end, a camera back for closing said rear end, means for detachably connecting the camera back to the rear end of the camera box, said back including a fixed base having its inner side facing said camera box and provided with a central orifice, a moulding secured to the inner side of said base and enclosing said orifice, an annular bearing member connected to the inner side of said base and encircling said orifice, a revoluble carriage rearwardly of said base and having a central opening, a ring having an annular flange overlapping and in front of said base, said ring being revolubly mounted in said orifice so as to movably engage said annular bearing member, means connecting said ring to the inner side of the carriage, the opening in the rear end of the camera box and the orifice in the base being each of such a size as not to obstruct the opening in said revoluble carriage regardless of the angular position of the latter, spaced parallel guide members connected to said carriage above and below said opening and adapted to slidably receive interchangeably a film holder and a ground glass screen, and a manually operable threaded bolt extending transversely through one side of the base and the bearing member so as releasably to engage the ring in order to maintain the carriage and holder in any rotatably adjusted position relative to the base so that pictures can be taken showing the subject in different angular relations relative to the opening in the carriage.

ADOLPH ENGELHARDT.

REFERENCES CITED

The following references are of record in the file of this patent:

UNITED STATES PATENTS

| Number | Name | Date |
| --- | --- | --- |
| 900,526 | Hall | Oct. 6, 1908 |
| 953,005 | Goddard | Mar. 22, 1910 |
| 1,001,386 | Goddard | Aug. 22, 1911 |
| 1,060,748 | Folmer | May 6, 1913 |
| 1,788,645 | Velton | Jan. 13, 1931 |